(12) United States Patent
Legagneux et al.

(10) Patent No.: US 8,427,039 B2
(45) Date of Patent: Apr. 23, 2013

(54) OPTICALLY CONTROLLED COLD-CATHODE ELECTRON TUBE

(75) Inventors: Pierre Legagneux, Le Mesnil Saint Denis (FR); Ludovic Hudanski, Sevres (FR); Jean-Philippe Schnell, Paris (FR); Dominique Dieumegard, Mareil-Marly (FR); Pierrick Guiset, Palaiseau (FR); Alfredo De Rossi, Paris (FR)

(73) Assignee: Thales, Neuilly-sur-Seine (FR)

( * ) Notice: Subject to any disclaimer, the term of this patent is extended or adjusted under 35 U.S.C. 154(b) by 465 days.

(21) Appl. No.: 12/447,966

(22) PCT Filed: Dec. 10, 2007

(86) PCT No.: PCT/EP2007/063636
§ 371 (c)(1),
(2), (4) Date: Apr. 30, 2009

(87) PCT Pub. No.: WO2008/068351
PCT Pub. Date: Jun. 12, 2008

(65) Prior Publication Data
US 2010/0072872 A1    Mar. 25, 2010

(30) Foreign Application Priority Data

Dec. 8, 2006    (FR) ..................................... 06 10731

(51) Int. Cl.
*H01J 31/00*    (2006.01)
(52) U.S. Cl.
USPC ........................................... 313/311; 313/2.1
(58) Field of Classification Search .......... 313/310–312, 313/2.1
See application file for complete search history.

(56) References Cited

U.S. PATENT DOCUMENTS

| 6,476,408 B1 | 11/2002 | Legagneux et al. |
| 6,522,080 B1 | 2/2003 | Faillon et al. |
| 6,692,327 B1 | 2/2004 | Deguchi et al. |
| 7,214,553 B2 | 5/2007 | Legagneux et al. |
| 7,491,269 B2 | 2/2009 | Legagneux et al. |

(Continued)

FOREIGN PATENT DOCUMENTS

| EP | 1022764 A | 7/2000 |
| FR | 2857954 A1 | 7/2003 |

(Continued)

OTHER PUBLICATIONS

"Enhanced Magnetic Coercivities in Fe Nanowires" by N. Grobert et al., Applied Physics Letters, vol. 75, No. 21, Nov. 22, 1999.

(Continued)

*Primary Examiner* — Joseph L Williams
*Assistant Examiner* — Brenitra M Lee
(74) *Attorney, Agent, or Firm* — Lowe Hauptman Ham & Berner, LLP

(57) ABSTRACT

In an optically controlled cold-cathode electron tube, the emitters 1, of nanometer and/or micron size and of elongate shape, have a structure comprising a first material (4) of sp2-bonding carbon type and a metallic second material (3), said first material being in contact with and surrounding said second material at its top and over the entire length of the emitter or at least part of said length starting from its top toward the base (b). The second material has a plasma frequency substantially equal to or greater than the frequency of the optical control wave.

15 Claims, 5 Drawing Sheets

U.S. PATENT DOCUMENTS

| | | | |
|---|---|---|---|
| 2002/0006489 A1 | 1/2002 | Goth et al. | |
| 2003/0087511 A1 | 5/2003 | Hidaka et al. | |
| 2004/0265592 A1* | 12/2004 | Nakamoto | 428/408 |
| 2007/0085114 A1 | 4/2007 | De Rossi et al. | |
| 2008/0007154 A1* | 1/2008 | Wei et al. | 313/497 |
| 2008/0251704 A1 | 10/2008 | Carras et al. | |

FOREIGN PATENT DOCUMENTS

| | | |
|---|---|---|
| FR | 2893184 | 5/2007 |
| JP | 2006216799 A | 8/2006 |
| WO | 2005045871 A | 5/2005 |
| WO | WO 2006063982 * | 6/2006 |
| WO | 2006121872 A | 11/2006 |

OTHER PUBLICATIONS

"Capillarity-Induced Filling of Carbon Nanotubes" by P.M. Ajayan et al., Nature 361, pp. 333-334, Jan. 28, 1993.

"A Method for Synthesizing Large Quantities of Carbon Nanotubes and Encapsulated Copper Nanowires" by A.A. Setlur et al., Applied Physics Letters, vol. 69, Issue 3, pp. 345-347.

"Fabrication of a New Generation of Track-Etched Templates and Their Use for the Synthesis of Metallic and Organic Nanostructures" by Laurence Dauginet-De Pra et al., Nuclear Instruments and Methods in Physics Research Section B: Beam Interactions With Materials and Atoms, vol. 196. Issue 1-2, Nov. 2002, p. 81-88.

"Controlled Growth of Single Nanowires Within a Supported Alumina Template" by A. Vlad et al., Nanotechnology 17, 4873-4876, (2006).

U.S. Appl. No. 11/721,970, filed Dec. 12, 2005 Not Yet Published.

"Enhanced Magnetic Coercivities in Fe Nanowires" by N. Grobert et al., Physics Letters, vol. 75, No. 21, Nov. 22, 1999.

* cited by examiner

OPTICALLY CONTROLLED COLD-CATHODE ELECTRON TUBE

CROSS-REFERENCE TO RELATED APPLICATIONS

The present application is based on International Application No. PCT/EP2007/063636, filed on Dec. 10, 2007, which in turn corresponds to French Application No. 0610731 filed on Dec. 8, 2006, and priority is hereby claimed under 35 USC §119 based on these applications. Each of these applications are hereby incorporated by reference in their entirety into the present application.

DOMAIN OF THE INVENTION

The invention relates to a cold-cathode electron tube and more particularly to an optically controlled tube.

Such electron tubes are used notably for producing terahertz (THz) detection systems for detecting molecules (for security purposes).

For these applications, the use of cold cathodes as emitters in these devices rather than "hot" thermionic cathodes offers various advantages, such as the possibility of directly modulating the electron emission, of obtaining electron beams in more monoenergetic packets, of obtaining "bespoke" beams of any shape, of consuming less power, of eliminating heat-up times, etc. Thus, the use of cold cathodes in electron tubes makes it possible to produce tubes that are more compact, lighter and more efficient.

TECHNICAL BACKGROUND

The invention relates to electron tubes having cold cathodes based on carbon nanotubes, which, compared with other technologies, increase stability, maximum current before electromigration, lifetime and form factor. Carbon nanotubes are formed from carbon having essentially sp2 bonds. They take the form of long thin hollow cylinders often closed at their ends and may be of two varieties: SWNT (single-walled carbon nanotube) and MWNT (multi-walled carbon nanotube). A single-walled nanotube, when it is perfect, may be defined as a graphene sheet (hexagonal carbon lattice) rolled up and closed on itself, thus forming a cylinder of monoatomic thickness consisting only of carbon atoms. What is thus obtained is a tube having a diameter of typically 0.7 to a few nm with a length ranging from a few tens of nanometers to a few millimeters. A multi-walled nanotube is essentially formed from a concentric contiguous stacking of graphene cylinders, for example 7 to 10 cylinders, with for example an inside diameter of a few nanometers and an outside diameter of about 15 nanometers or more.

According to the prior art, an electron tube of this type comprises cathodes based on a uniform arrangement of carbon nanotubes spaced apart by one to two times their height and aligned vertically, perpendicular to the conducting substrate that supports them. These cathodes have already achieved currents of 10 mA over an area of 0.5×0.5 mm$^2$ and beam current densities (over macroscopic areas) of 4 A/cm$^2$ in continuous mode and a peak current density of 15 A/cm$^2$ in 1.5 GHz modulated emission mode. These current densities are lower than those provided by metal-tipped cathodes, but they are close to those emitted by thermionic cathodes, of the order of 1 to 10 A/cm$^2$ at the source, making it possible after concentration to obtain beams having a current density of the order of 50 to 100 A/cm$^2$. It should be noted in this regard that the beams from thermionic cathodes can be concentrated more easily (the cathodes themselves may be given a focusing shape) than the beams emitted by cold cathodes. This requires, in the case of cold cathodes, on the one hand, collimation optics and, on the other hand, a much higher current density at the source.

There is an increasing need for higher current densities in order to be able to provide the market with microwave amplifiers and oscillators that are more compact, lighter and of higher power, electrically or optically controlled THz sources, high-brightness ultraviolet and X-ray sources, and more generally to improve system performance: transmission rate (digital radio or television), brightness (UV or X-ray sources), compactness, etc. There is also an increasing need for these dense beams to be of better quality, notably more monoenergetic, so as to simplify the optics, and collectors (notably in traveling-wave tubes). Moreover, the practical electrical conductivity, electrical cut-off frequency, thermal conductivity and plasma frequency values of nanotubes restrict the effectiveness of their use in certain applications. In particular, they are no longer conducting at optical frequencies, thereby preventing them from being used in direct optical control devices, in particular in generators.

There is therefore a need at the present time for cold-cathode electron tubes that can meet these various criteria, and notably provide electron beams that are more dense (current density of the order of 10 to 100 A/cm$^2$), and more monoenergetic, while still remaining very compact and stable.

Cold cathodes based on nanotubes have in this regard technological limitations that prevent any hope of improving their performance sufficiently. Notably, the moderate conductivity of the material obtained in practice leads to a voltage drop along the nanotube: heat deposition by the Joule effect along the nanotube. This results in a limitation of the currents emitted, so as not to risk destruction of the nanotubes by heat, and consequently a limitation in the current density at the source. This is because above a certain current density, the destruction of the nanotubes is observed.

It may be demonstrated that this destruction occurs when a "destruction" temperature is exceeded.

After destruction of a nanotube, an extended area (an area with a diameter of the order of 10 μm around the initial position of the nanotube) is generally observed in which the silicon substrate is molten (the melting point of silicon $T_m(Si)$: 1687 K).

This may be explained by the thermal dissipation through the Joule effect in the carbon nanotube: when a current I flows through the nanotube, its temperature increases because of this thermal dissipation.

A nanotube may be considered as a one-dimensional conductor. When a current I flows through said nanotube, its temperature increases with the position along the axis and the maximum temperature is reached at its end.

Using the one-dimensional heat equation (taking Joule heating and thermal conduction along the nanotube into consideration and neglecting radiation), it is easy to express the temperature at the tip of the nanotube $T_{tip}$ as a function of the temperature of the substrate $T_{substrate}$:

$$T_{tip} = T_{substrate} + I \times P_{dissipated}/(2\kappa S),$$

where I is the length of the nanotube (in meters), $P_{dissipated}$ is the power dissipated in the nanotube (in watts), $\kappa$ is the thermal conductivity of the nanotube (in W·m$^{-1}$·K$^{-1}$), and $S = \pi r^2$ is the cross section of the nanotube (in m$^2$) where r is the radius of the nanotube.

The thermal conductivity of carbon nanotubes has been experimentally determined and various values ranging between $\kappa=25\ W\cdot m^{-1} K^{-1}$ and $\kappa=200\ W\cdot m^{-1}\cdot K^{-1}$ are found in the literature.

Taking a nanotube length $l=5\ \mu m$ and a nanotube radius $r=25\ nm$, it is then possible to plot the change in temperature at the tip of the nanotube as a function of the dissipated power, for various values of the thermal conductivity.

The results are shown in FIG. 1 for three values of the thermal conductivity $\kappa$: 25, 100 and 200 $W\cdot m^{-1}\cdot K^{-1}$. It should be noted that the 100 $W\cdot m^{-1}\cdot K^{-1}$ value of $\kappa$ seems the most probable one for MWNTs (multi-walled nanotubes).

The graph in FIG. 1 also shows the melting point of carbon $T_m(C)$, which is 4100 K, and the temperature $T_{disintegration}$ at which, according to the literature, the tip of the nanotubes subjected to the emission electric field starts to disintegrate, i.e. 2000 K.

This graph shows that the power dissipated (a few tenths of mW) in the usual nanotubes, the resistance of which ranges from the order of a few tens of kilohms to one hundred kilohms, when they emit currents of the order of 0.1 mA, enables very high temperatures to be reached at their tips, or even the disintegration temperature. This therefore results in the destruction of the emitter and the formation of a conduction channel between the cathode and the anode, with formation of an electric arc that causes a crater to be observed.

The aim of the invention is to increase the power of cold-cathode electron tubes and to make them more compact, lighter and more efficient. More particularly with regard to UV and X-ray sources, the aim is also to increase the brightness, so as to improve the resolution thereof and to minimize analysis times. This requires having cold-cathode electron tubes capable of delivering highly monoenergetic electron beams with a high current density.

One idea at the basis of the invention is to reduce the resistance of the nanotube so as, on the one hand, to make the beam more monoenergetic and, on the other hand, to prevent or limit the deposition of heat by the Joule effect along the axis of the nanotube, so as to move back the destruction temperature and thus allow higher current densities.

In the invention, to solve the current density limitation problem in the nanotubes of cold cathodes according to the prior art, one idea is to form an emitter based on a carbon nanotube that is no longer hollow but on the contrary is one such that the inside of the cylinder contains a metallic material.

Metal-cored nanotubes are known in the prior art, for example those having metal cores of Pb, Cu, Fe, Co, Ni, Sn, etc. Such nanotubes have been fabricated and studied, demonstrating that they possess useful magnetic properties enabling magnetic data storage and read devices to be produced, as explained in the article "*Enhanced magnetic coercivities in Fe Nanowires*" by N. Grobert et al., Applied Physics Letters, Vol. 75, No. 21, Nov. 22, 1999.

Also known, from the application US 2002/0006489 published on Jan. 17, 2002, is an emitter formed from a hydrogenated carbon nanotube, formed by a metal protrusion covered with a hydrogenated carbon nanotube. Such an emitter is designed for applications requiring low currents in a "bad" vacuum environment. Here, the metal structure enables the conductance to be maintained if the perimeter of the emitter becomes damaged due to the electron bombardment that occurs in such an environment.

The invention relates to emitters capable of providing very high current densities, of the order of 10 to 100 amps/$cm^2$, whereas in the aforementioned document there were low current densities of the order of 10 milliamps/$cm^2$.

SUMMARY OF THE INVENTION

In the invention, it is the possibility of pushing up the carbon nanotube destruction temperature that is sought and the possibility of making the beam more monoenergetic. The idea forming the basis of the invention is that the metal cores have a lower electrical resistance than the carbon nanotubes. The injected current will therefore naturally pass essentially through the metal core. This results in two beneficial effects. The first one is that the phenomenon of thermal energy deposition by the Joule effect along the longitudinal axis of the tip is very limited: the good conductivity of the core material counters the low conductivity of the sheath: the destruction limit temperature is thus moved away, so that it is possible to achieve much higher current densities. Furthermore, since the metallic material is "coated" with carbon material with sp2 symmetry, it is protected from the environment and the emitter thus formed benefits from the stability properties of the sheath. The second beneficial effect is that the electric potential difference developed between the base of the emitter and its tip is very low. The loss of energy of the electrons in the emitter before emission will be greatly reduced (of the order of 0.1 eV instead of a few eV for a standard nanotube), irrespective of the current emitted, and, in addition, being low, it will vary very little from one emitter to another. This will result in the emission of a highly monoenergetic beam.

Thus, the separate advantages of the nanotube and the metal combine, whereas their drawbacks disappear. The effect of combining the two materials to form an emitter is therefore twofold. An additional advantage of the emitter thus formed compared with "hollow" carbon nanotubes according to the prior art for cold cathodes is notably the benefit of the high plasma frequency of metals and their alloys, enabling a cathode comprising such emitters to be advantageously used in optically controlled terahertz amplifiers.

With cathodes provided with such emitters, it is thus possible to produce high-current-density electron tubes that are compact, are stable and have a high plasma frequency. These emitters are therefore conductors at optical frequencies and can be used in wave generators with direct optical control via the electric field of an optical wave, especially terahertz wave generators.

Thus, the invention relates to an optically controlled cold-cathode electron tube, the cold cathode comprising an emitter or a plurality of emitters, of nanometer and/or micron size and of elongate shape. The emissive zone of each emitter comprises a first material of the carbon type with substantially sp2 bonding, covering, in direct or indirect contact, a metallic second material having a plasma frequency approximately equal to or greater than the frequency of the optical control wave.

In one embodiment, the emitter comprises a third material that catalyzes the sp2 carbon growth, located between said first material and said second material and in contact with both of these materials.

In one embodiment, the second material is in direct contact with said first material, over all or part of the length of the emitter starting from the top, and is a metal chosen from Ni, Fe, Co, Y, or an alloy with at least one of these metals.

The second material has at least one of its dimensions shorter than the wavelength of the optical wave.

The invention is applicable to microwave or terahertz electronic amplifying devices.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

We will firstly describe a cold cathode having one or more electron emitters according to the invention, which is particularly advantageous for use in an optically controlled electron tube. We will then describe an optically controlled electron tube according to the invention.

Figure 2:
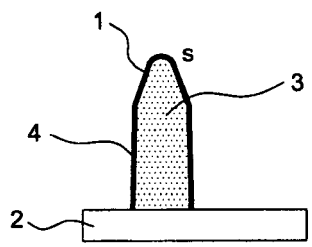
FIG. 2 illustrates schematically a cathode having an emitter according to the invention.

A cold cathode having an electron emitter according to the invention is illustrated in FIG. 2. It comprises an emitter 1 formed on a conducting substrate 2, the structure of which mainly comprises a first material 4 of the carbon type with sp2 symmetry and a metallic second material 3, the first material forming a surface coating on the second material, i.e. surrounding and in direct contact with this second material.

In greater detail, the emitter comprises a metallic part 3, of nanometer and/or micron size, which is encapsulated or enveloped by the carbon coating 4 of sp2 symmetry. This coating 4 forms a carbon nanotube and the metallic part 3 forms the metal core of this nanotube.

In the example, the metallic part 3 entirely occupies the interior of the nanotube 4 over the entire length of the emitter.

In the invention, for an optically controlled electron tube application, at least one of the dimensions of the metallic part 3 is chosen to be shorter than the optical wavelength. For example, the height of the metallic part of the emitter, which in the example illustrated in FIG. 2 is equal to its internal length, is chosen to be shorter than the optical wavelength.

More generally, it is sufficient for the metallic part 3 of the emitter to be present at the top of the emitter. For example, as illustrated by the variant shown in FIG. 3a, the metallic part may have a continuous shape comprising the top t of the nanotube and part of the length of the nanotube from the top toward the base b, depending on the emitter fabrication process. Beneath the metallic material 3, the emitter is hollow.

Figure 3B:
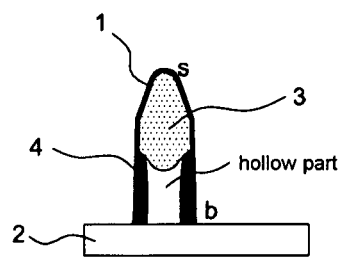
FIGS. 3a and 3b illustrate shapes variant of such an emitter.

The shape of the material 3 may vary. FIG. 3b thus illustrates an example in which the lower part of the metallic material, i.e. on the side away from the top, has a conical shape, with the apex of the cone pointing toward the base b. The coating with substantially sp2-bonded carbon sheets is therefore thicker in this region.

Figure 3A:
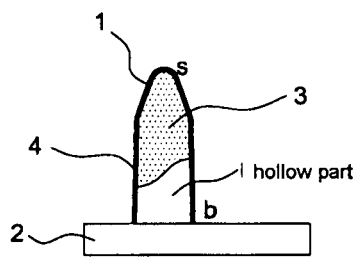

It should be noted that FIGS. 2 and 3a and 3b are highly schematic. They show an emitter with a tip shape at the top, but other shapes, notably more rounded shapes, are possible.

Figure 8:
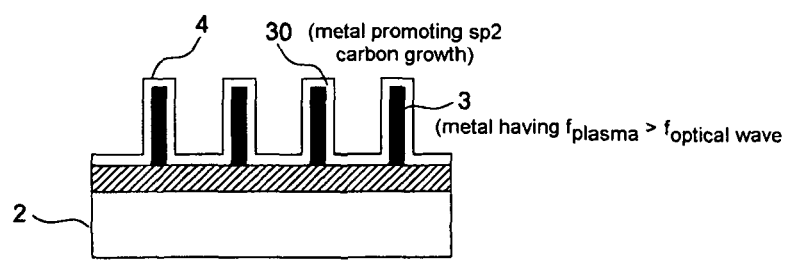
FIG. 8 illustrates schematically a variant of a structure of an emitter according to the invention.

FIG. 8 illustrates another emitter embodiment for a cold cathode according to the invention, which can be used in an optically controlled electron tube.

In this embodiment, the emitter comprises a metallic third material 30 which is a catalyst for the growth of substantially sp2-bonded carbon, which material is located between said metallic second material 3, having a plasma frequency approximately equal to or greater than the wavelength of the optical control wave, and the carbon coating 4 and in contact with both these materials 3 and 4.

For high-power applications, the cathode will in practice comprise a plurality of emitters such as the emitter 1 illustrated in FIG. 2 or 3, these being placed on the same substrate.

Figure 4:
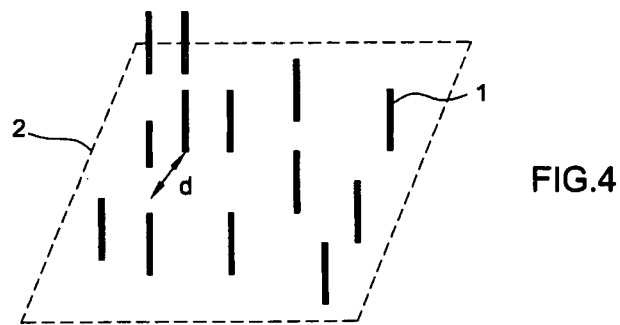
FIG. 4 illustrates schematically a cathode comprising a plurality of emitters according to the invention arranged in an arbitrary manner.
Figure 5A:
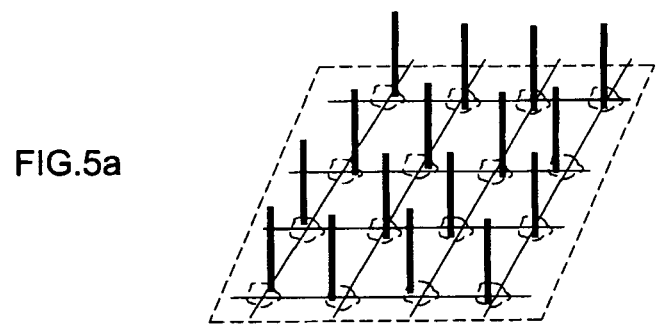
FIG. 5a and FIG. 5b respectively illustrate, schematically, a cathode comprising a plurality of emitters according to the invention in a quasi-deterministic periodic and deterministic periodic arrangement, respectively.
Figure 5B:
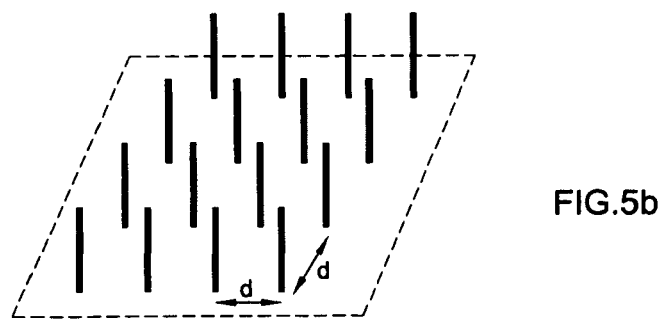

FIGS. 4, 5a and 5b illustrate such a cathode comprising a plurality of emitters according to the invention. In FIG. 4, the emitters are arranged in a random pattern. In FIGS. 5a and 5b, the emitters are arranged in a quasi-deterministic and deterministic pattern respectively. In random or quasi-deterministic arrangement situations, the average distance between the emitters is chosen to correspond to an optimum distance, notably so that there is little mutual screening of the electric fields at the tip of the emitters. This is because screening of the electric fields between the emitters is prejudicial to the phenomenon of electron extraction at each emitter. The average distance is determined so as to obtain an emitter density on the substrate which is optimum, i.e. corresponds to a maximum density permitted by the fabrication process used, and which guarantees that there are no field-screening effects at the tip tops.

The nonscreening condition is generally given by a distance d of between approximately one to two times the height h of the emitter 1 (or of the nanotube 4) in the case of deterministic positioning. In the case of a random or quasi-deterministic positioning, the average distance between emitters is considered. In this case, the condition for nonscreening of the electric fields will not always be met between two adjacent emitters, and the current density emitted by the cathode will be somewhat lower.

In the case of a deterministic positioning of the emitters, the nonscreening condition may be strictly met, this being more advantageous in terms of the current density of the beam that can be obtained.

The possibility of positioning the emitters on the substrate in a random manner (FIG. 4), in a quasi-deterministic manner (FIG. 5a) or a deterministic manner (FIG. 5b) depends on the fabrication process used.

In the case of a deterministic positioning, the pattern will advantageously be regular, and preferably periodic. In the example illustrated (FIG. 5b), there is thus a periodic array of 4×4 emitters.

In the quasi-deterministic arrangement shown in FIG. 5a, there is a slight random deviation of the position of each emitter in comparison with an ideally periodic arrangement of the emitters, as illustrated in FIG. 5b.

A few examples of the fabrication of emitters according to the invention will now be described by way of nonlimiting examples.

In a first fabrication example, carbon nanotubes 4 are produced on the substrate and then these nanotubes are filled using thermal or chemical methods. Notably, the reader may refer to the following articles that describe such filling processes: "*Capillarity-induced filling of carbon nanotubes*" by P. M. Ajayan et al., Nature 361, pp 333-334, Jan. 28, 1993; and "*A method for synthesizing large quantities of carbon nanotubes and encapsulated copper nanowires*" by A. A. Setlur et al., Applied Physics Letters, Vol. 69, Issue 3, pp 345-347. The carbon nanotube fabrication processes are well known and use techniques that enable the nanotubes to be positioned in a regular pattern (FIG. 4). The nanotube filling techniques may result in incomplete filling, as illustrated in FIG. 3.

In another fabrication example, simultaneous carbon nanotube/metal core growth by thermolysis of organometallic compounds, notably by the thermolysis of ferrocene, as described for example in the article: "*Enhanced magnetic coercivities in Fe nanowires*" by N. Grobert et al., already mentioned. These processes for direct growth of metal-cored nanotubes by thermolysis make it possible to obtain a compact metal, unlike the filling techniques. This metal compactness obtained is advantageous since the conduction of the metal core is better—less heat deposition and lower potential difference.

These thermolysis processes result in a dense, random, non-defined positioning of the emitters (FIG. 4). Emission preferably takes place via the longest nanotubes that are further apart than the rest of the nanotubes. However, the density of these effective emitters is not optimum, nor is their average distance.

Figure 1:
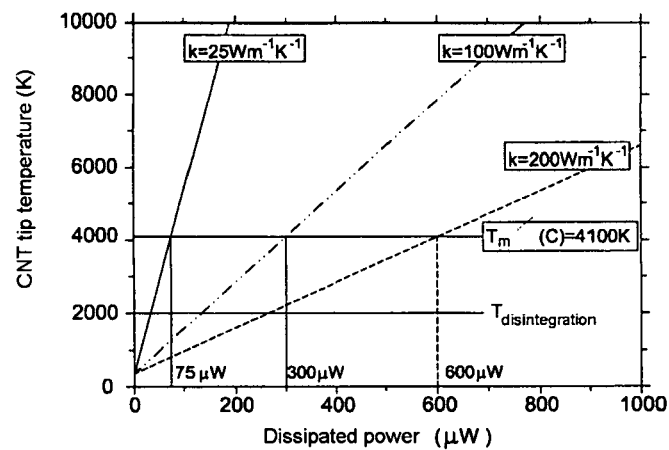
FIG. 1 illustrates the thermal destruction phenomenon in a carbon nanotube.

In another fabrication process, the metallic part, in the form of wires, is firstly produced and then the carbon coating 4 of sp2 symmetry is created thereon. In this case, an emitter is obtained in which the metallic part is complete from the base to the top of the emitter, as illustrated in FIG. 1, and which is entirely coated or sheathed with carbon of sp2 symmetry in the form of sheets. The emitters obtained are arranged parallel to one another, approximately orthogonal to the substrate, this being very favorable for the emission of a beam of optimum density.

Figure 6:
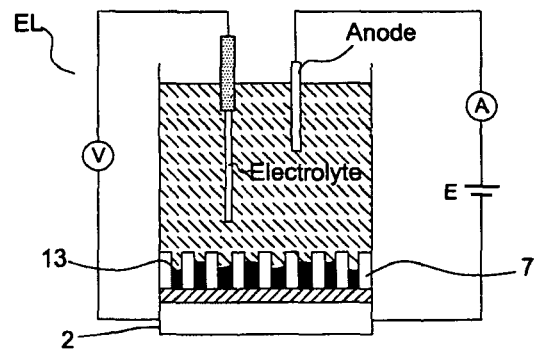
FIG. 6 illustrates an electrolysis step in a fabrication process that can be used to fabricate a cathode according to the invention.

The metal wires are produced on the conducting substrate by any known process. For example, as illustrated in FIG. 6, a microporous or multipore membrane or else a "track-etched" membrane 7 is used in order to grow a metal or an alloy 13 in the pores of this membrane by an electrolysis process in order to obtain the metal wires. Next, the membrane is dissolved. What is therefore obtained is a substrate 2 with a plurality of vertical parallel-aligned metal wires 20 as illustrated schematically in FIG. 7.

In this process, it is also possible to have the substrate itself covered with carbon of sp2 symmetry, so as to be electrically continuous with the coating 4 on the wires (see FIG. 8). This provides very good bonding of the emitters to the substrate.

Figure 7:
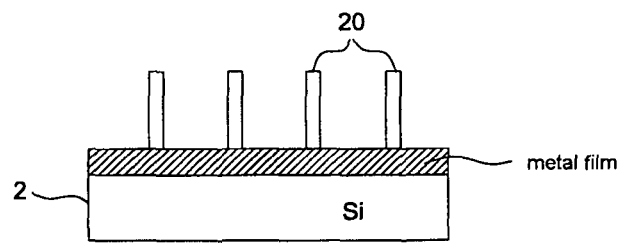
FIG. 7 illustrates the metal wires obtained by this electrolysis step.

It should be noted that in the latter case, the substrate will for example be made of silicon coated with a metal film promoting growth of the wires (FIGS. 7 and 8).

A metal wire growth process has been described in the publication "*Fabrication of a new generation of track-etched templates and their use for the synthesis of metallic and organic nanostructures*" by Laurence Dauginet-De Pra et al., Nuclear Instruments and Methods in Physics Research Section B: Beam Interactions with Materials and Atoms, Volume 196, Issues 1-2, November 2002, pages 81-88. Such a process uses in practice irradiation with high-velocity heavy ions, for example 200 meV argon ions, of a photosensitive polymer film, for example a polycarbonate film, deposited on the substrate. This irradiation results in the formation of a disturbed zone called a "latent track", which corresponds to a considerable deposition of energy along the straight path of the ion in the polymer. The latent tracks thus formed in the polymer may then be developed by chemical etching, resulting in the creation of mutually parallel straight cylindrical pores of very small diameter. The latent tracks that are formed by this irradiation are then developed, typically by chemical etching using an appropriate chemical agent. A plurality of pores, i.e. straight cylindrical holes in the membrane 7 (FIG. 6), is obtained over its entire thickness.

With such a process, the pores obtained, and consequently the metal wires 20, are distributed randomly in the membrane and on the substrate respectively. If it is desired to position the metal wires in a quasi-deterministic regular pattern, a conducting substrate covered with an insulating film, in which holes are provided by lithography and chemical etching for example, will advantageously be used. The holes will be placed in the arrangement desired for the metal wires, for example a periodic pattern with a well-defined spacing. The holes will have a size such that with the chosen irradiation dose, on average a single latent track is produced in the membrane in a zone located above the hole. Electrolytic growth will take place only in the pores of the membrane that are located above the holes. In the case of the other pores, the continuity of electrical conduction will be interrupted by the insulating film, and electrodeposition will not take place.

Other positioning processes may be used, such as those described in the French patent published under the number FR 2 857 954 filed on Jul. 25, 2003, entitled "Procédé croissance localisée de nanofils ou de nanotubes [Process for the localized growth of nanowires or nanotubes]".

Thus, an array of metal wires is obtained. These wires are mutually parallel and of the same dimensions, defined by the duration of the electrodeposition, by the thickness of the membrane and the size of the pores, the pore size being mainly dependent on the characteristics of the irradiation I and on the method of development, and may be positioned on the substrate in either a random or quasi-deterministic pattern.

Another metal wire growth process that can be used involves a nanoporous alumina membrane. This process is described in the publication "*Controlled growth of single nanowires within a supported alumina template*", by A. Vlad et al., Nanotechnology 17, 4873-4876, (2006). An alumina ($Al_2O_3$) membrane is produced on a conducting substrate by deposition on this substrate of an aluminum membrane followed by anodic oxidation of this membrane: what is obtained is a nanoporous membrane with vertical pores formed by perforation induced by the anodic oxidation effect, these pores being arranged randomly. To position the metal wires in a deterministic or quasi-deterministic manner, a mask is used. For example, a silicon nitride film is deposited on the alumina membrane and is itself covered with a PMMA (polymethyl methacrylate) layer. Apertures are produced by the known technique of electron-beam lithography in the PMMA membrane that then constitutes a mask. The silicon nitride film is exposed by chemical etching through this mask. The silicon nitride (or PMMA/silicon nitride) mask allows selection of the pores in the alumina membrane, with a single pore per aperture of the mask, in which pores the metal wires are grown by electrolytic growth. The other pores are masked. It is also possible to use a mask made of insulating material placed beneath the membrane, the electrolytic growth taking place only in the pores of the membrane that are located above the holes, as described above.

The carbon coating 4 is then created on top of each of the metal wires. Several processes may be used.

In a first example, this process will comprise the following steps:
  chemical vapor deposition (CVD) or plasma-enhanced chemical vapor deposition (PECVD) or deposition by laser ablation or by electric-arc vaporization of a graphite target, of an amorphous carbon film on the surface of the substrate 2 and of the metal wires 20; followed by
  vacuum heat treatment with a phase in which the temperature rises followed by a step in which the temperature is brought back down. Typically, a temperature rise up to a predetermined temperature followed by a hold lasting from around ten to several tens of minutes at this temperature and then a step in which the temperature is brought back down will be used.

This treatment makes it possible, in a first step, typically starting at the end of the temperature rise, for at least some of the amorphous carbon deposited to dissolve inside the metallic material beneath the surface over a certain depth, and then, in a second step, for there to be an expulsion of the dissolved carbon out of the metallic material, which expulsion takes place in the form of sp2-bonded carbon sheets that then form the desired carbon coating 4 of sp2 symmetry.

In one practical example, with nickel metal wires, the coating 4 may be obtained by a heat treatment carried out at about $10^{-3}$ millibars, with a temperature hold at 850° C. for a time at this temperature of around ten minutes.

In general, a phase will then be provided in which the excess, i.e. undissolved, amorphous carbon is removed, for example by an annealing step in oxygen at 400° C. or by a plasma treatment.

The provision of carbon may take place differently. Notably, carbon may be provided by ion implantation: the carbon is sent with a high kinetic energy so that it passes through the surface of the metal wires (and of the substrate) and penetrates over an adjustable depth thereinto. The carbon is thus in dissolved form in the metal before the heat treatment step. Thanks to the heat treatment step, this carbon is expelled from the metal in the form of sp2-bonded carbon sheets, forming the desired coating 4.

In the foregoing, it is preferred to choose for the metal wires a metal known to catalyze the growth of carbon nanotubes. Examples are nickel, iron, cobalt, alloys thereof, etc.

Another deposition process may be used that may be advantageous with regard to the properties of the emitter obtained—this is the deposition of a carbon solid solution and a metal on the metal wires and the substrate.

This process is advantageous since, after the heat treatment step, it enables the following structure, as illustrated in FIG. 8, to be obtained: a metal wire 3 coated with a film 30 essentially consisting of the metal that was in solution with the carbon, and the carbon coating 4. This is advantageous as it then makes it possible to choose the metal 30 containing the carbon in solution in which the dissolved carbon expulsion phenomenon will take place, with the best capability of producing the sp2 carbon coating, via which the phenomenon of expulsion in the form of sp2-bonded carbon sheets is the most effective, whereas the metal 3 is chosen for its plasma frequency. In this case, the core is a double-metal core. The metal 30 in contact with the carbon coating, which is a better catalyst for growth of the sp2 carbon coating, will for example be Fe, Co, Ni, Y, etc., or an alloy based on at least one of these metals, for example CoPt, etc. The other metal is chosen for its plasma frequency. At least one of its dimensions, for example its height, is chosen to be shorter than the wavelength of the optical wave for controlling the electron tube comprising a cathode according to the invention.

The fabrication processes that have just been described are collective fabrication processes for fabricating a plurality of emitters 1, but they may apply equally well, depending on the intended application, to the fabrication of a single emitter.

In one practical example, emitters 1 used in the invention may have a height of around 2 microns, a diameter of 50 nanometers and an average spacing between the emitters of 4 microns, i.e. twice the height of the emitters. In this regard, the tubes may equally well be referred to as having nanoscale dimensions or micron-scale dimensions, rather than nanotubes, depending on the desired dimensions.

The cathodes based on emitters according to the invention allow the production of electron tubes emitting beams with a high current density of up to 100 A/cm$^2$ and higher, depending on the intended applications. With a plurality of emitters, these compact stable high-current-density tubes are capable of providing electron beams with a current density of the order of 10 to 100 A/cm$^2$ or higher.

The cold cathodes cK based on emitters according to the invention thus make it possible to produce optically controlled terahertz signal amplifiers of very high performance, since they are no longer limited by the low plasma frequency of the carbon nanotubes.

Figure 9:
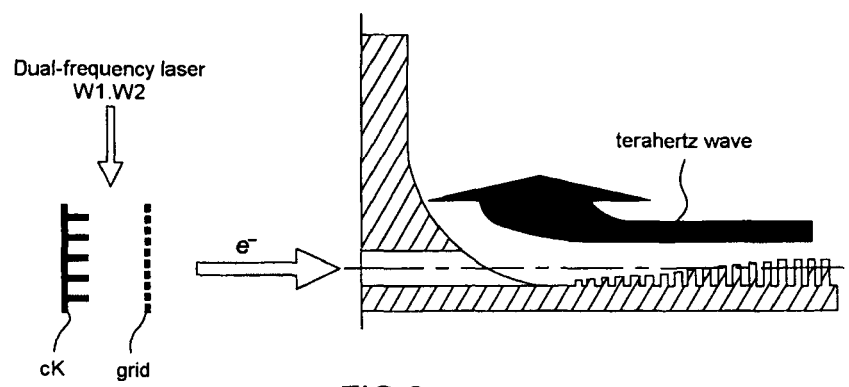
FIG. 9 illustrates an optically controlled terahertz signal amplifier.

A corresponding optically controlled electron tube is shown in FIG. 9.

In this THz-frequency signal amplification field, an optical control technique uses the emission of electron packets by emitters through the effect of the electric field of two interfering optical waves W1, W2, the frequency difference of which is of the order of 1 THz. The availability of THz amplifiers is advantageous as it enables the delivery of power (THz amplifiers) to be decoupled from the quality of the signal (use of low-power THz sources, but sources having other advantageous characteristics such as for example better spectral quality). These optically controlled terahertz signal amplifiers have advantageous applications such as, for example, the detection of dangerous molecules. Now, carbon nanotubes, which have a low plasma frequency of the order of 300 GHz, do not allow field amplification since, when they are placed in the electric field of a wave of optical frequency, they behave as dielectrics: no conduction and therefore no electron accumulation at the tops thereof. With an emitter of the metal-cored carbon nanotube type according to the invention, there is the benefit both of a higher current density and a high plasma frequency, while still being compatible with the application described. An electron tube according to the invention therefore provides all the properties to be advantageously used in this field.

One particularly advantageous variant is that in which the second material 3 is contained at least by the top of the nanotube and occupies a volume whose dimensions are preferably small compared with the wavelength of the optical wave.

The second material is preferably given particular values of aspect ratio (height-to-diameter ratio) that encourage the concentration and localization of the incident optical field, notably on the emissive surface of the emitter, by the plasmon resonance effect. The electric field at the top of the emissive surface becomes equal to the electric field of the optical wave multiplied by a gain g that depends on the aspect ratio of the second material and on the wavelength of the incident wave.

In particular, if the elongate shape of the second material is approximately a prolate ellipsoid, it is possible to provide the set of equations that connect the gain to the incident wavelength and to the aspect ratio in the case in which the second material has the shape of a prolate ellipsoid. The case in which the polarization of the wave is parallel to the axis of revolution of the nanotube is considered, this axis itself being parallel to the major axis of the prolate ellipsoid. Let a and b be the half-length of the minor axis and the half-lengths of the major axis, respectively, of the prolate ellipsoid (which half-lengths may possibly be equal in the case of a sphere), let f be the ratio of the major axis to the minor axis of the ellipsoid, namely f=b/a, and let e be its eccentricity, such that:

$$e = \sqrt{1-f^{-2}}.$$

The gain is then expressed analytically by:

$$g = \frac{1}{1+A}$$

where $$A = \frac{\varepsilon_1 - \varepsilon_m}{2e^3 f^2 \varepsilon_1}\left(2e + \ln\left(\frac{1-e}{1+e}\right)\right),$$

in which $\varepsilon_1$ is the relative permittivity of the medium in which the ellipsoid lies ($\varepsilon_1=1$ in the case of a vacuum) and $\varepsilon_m$ is the relative permittivity of said second material constituting the ellipsoid, with:

$$\varepsilon_m = 1 - \frac{\omega_p}{\omega(\omega - i\tau)},$$

where $\omega$ is the angular frequency of the wave given as a function of the incident wavelength by the formula:

$$\omega = 2\pi c/\lambda,$$

and $\omega_p$ is the plasma angular frequency of said second material and $\tau$ its electron relaxation time.

Figure 10:
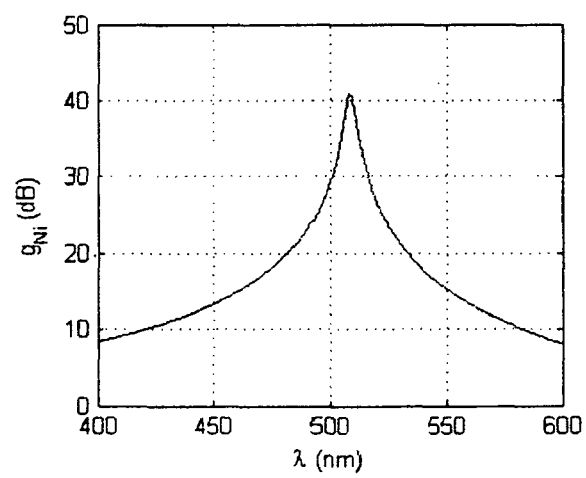
FIG. 10 shows the gain as a function of the wavelength for a nickel particle.

FIG. 10 shows the gain expressed in dB (20 log g) as a function of the wavelength for a nickel second material 3 for which $\varepsilon_1=1$ and f=1.4. With this aspect ratio, the existence of resonance at a wavelength of about 525 nm is observed.

By adjusting the incident wavelength with respect to the resonance of the system, we see that gains of the order of 40 dB become possible.

If the aspect ratio f of the second material 3 is changed, a resonance at another wavelength is obtained.

Figure 11:
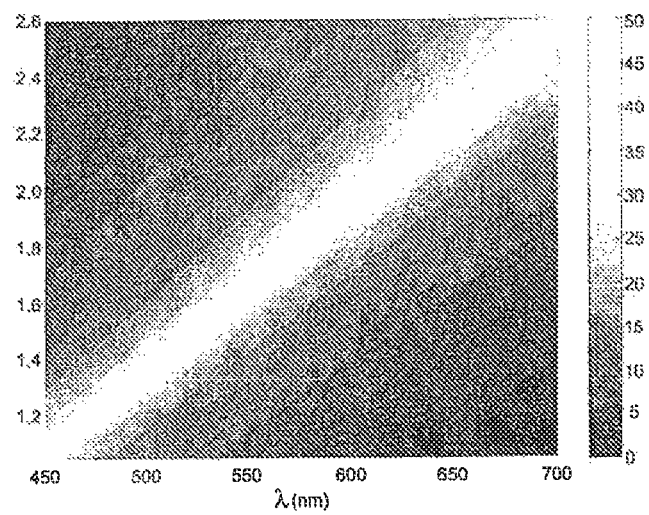
FIG. 11 shows the aspect ratio as a function of the wavelength, the value of the gain being indicated by the gray level according to the gray scale indicated on the right.

FIG. 11 shows the aspect ratio as a function of the wavelength for obtaining a maximum gain (white line), again for nickel. The gray level scale gives the gain values in dB for all the points in the figure. This figure shows that for a given wavelength, it is possible to choose an aspect ratio that allows a high gain to be achieved.

The advantages in terms of gain shown by way of example in the case of a prolate ellipsoid are approximately maintained in the case of simply elongate shapes.

It should be noted that the second material 3 is typically surrounded by around ten graphene sheets. This surface layer disturbs the situation that we have just described, by slightly reducing the gain (by a few dB) and the frequency of the resonance. We still retain the high gain in terms of field at the point where field emission takes place.

Another particularly advantageous variant consists in using, in the photocathode, surface-wave structures such as those described in the patent application FR 05/11463 entitled "Structure optique de localisation d'un champ électromagnétique et dispositif détecteurs ou émetteurs comprenant une telle structure [Optical structure for positioning an electromagnetic field and detector or emitter devices comprising such a structure]". These structures enable the incident optical wave to be coupled with surface waves and the optical field to be concentrated at the position of the emitter sites.

Figure 12:
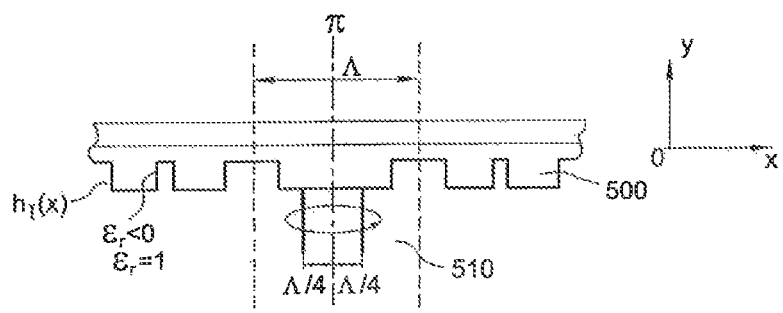
FIG. 12 shows a cold cathode comprising a surface-wave device according to one embodiment of the invention.

FIG. 12 shows such a cold cathode with emitters 510 comprising such a surface-wave device. It comprises a dielectric layer 500 of negative dielectric permittivity having a surface in relief in contact with the vacuum.

The emitters 510 are produced in relief on the layer 500, in a zone C in which the electric field is positioned in terms of x and y. What is obtained, by the effect of coupling the incident optical wave with a surface mode, is a reorientation of the electric field of the optical wave, which becomes parallel to the axis of the emitting tip. This effect, combined with the advantageous effects of emission via an emitting tip placed on an substantially sp2-bonded carbon nanotube with a metal core according to the invention, makes it possible to produce a particularly efficient optically controlled electron tube.

Finally, various types of optical control may be used. It is possible to use a single optical wave output by a single source, for example a laser. In this case, a modulation signal is "impressed" on the wave prior to its arrival on the cathode. It is also possible to use two optical waves having very close wavelengths so that their frequencies differ by a few GHz to a few THz, as explained above. This may for example be a dual-frequency laser. In all cases, the spectrum of the incident wave or waves remains very narrow relative to the width of the plasmon resonance in said second material and relative to the width of the resonance of the cavity of the concentrating structure, so that all the frequencies or wavelengths present in the spectrum undergo the same gain.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An optically controlled cold-cathode electron tube, said tube comprising a cold cathode which includes:
   a conductive substrate;
   an emitter or a plurality of emitters, formed on said conductive substrate, of nanometer and/or micron size and of elongated shape in a direction perpendicular to said conductive substrate, and
   a source generating an optical wave for direct optical control of the emitter or the plurality of emitters via an electrical field of said optical wave,
   wherein each said emitter comprises a first material of the carbon type with substantially sp2 bonding, encapsulating, in direct or indirect contact, a second metallic material, said second metallic material at least located at a top of the emitter, and
wherein said second material has a plasma frequency approximately equal to or greater than a frequency of the optical control wave.

2. The electron tube as claimed in claim 1, wherein the emitter further comprises a third material that catalyzes the sp2 carbon growth, located between said first material and said second material and in contact with both of the first and second materials.

3. The electron tube as claimed in claim 1, wherein the second material is in direct contact with said first material, over all or part of a length of the emitter starting from the top of said emitter, and is a metal chosen from Ni, Fe, Co, Y, or an alloy with at least one of these metals.

4. The electron tube as claimed in claim 1, wherein said second material has at least one dimension shorter than a wavelength of the optical control wave.

5. The electron tube as claimed in claim 4, wherein the second material has an elongated shape with a defined aspect ratio that maximizes a field at the top of the emitter.

6. The electron tube as claimed in claim 4, wherein the second material has a prolate ellipsoidal shape with an aspect ratio equal or close to values that maximize a field at the top of the emitter.

7. The electron tube as claimed in claim 1, wherein the cold cathode further comprises a surface-wave device for coupling an incident optical control wave with surface waves and for concentrating an optical field at the emitters.

8. The electron tube as claimed in claim 1, wherein the emitters of the cold cathode are placed parallel to one another and approximately orthogonal to the substrate.

9. The electron tube as claimed in claim 1, wherein said emitters are separated from one another by an average distance approximately equal to one to two times an average height of said emitters.

10. The electron tube as claimed in claim 1, wherein the emitters of the cold cathode are placed relative to one another in a deterministic or quasi-deterministic pattern.

11. The electron tube as claimed in claim 1, wherein the emitters of the cold cathode are placed relative to one another in a regular or periodic arrangement.

12. The electron tube as claimed in claim 1, wherein the emitters of the cold cathode are placed relative to one another in a random or quasi-random pattern.

13. The electron tube as claimed in claim 1, wherein the optical control is via a single modulated optical wave.

14. The electron tube as claimed in claim 1, wherein the optical control is via two optical waves of close frequencies forming beats within a microwave or THz frequency range.

15. An optically controlled microwave or terahertz electronic amplifying device comprises the electron tube which includes a cold cathode,
wherein said cold cathode includes:
a conductive substrate;
an emitter or a plurality of emitters, formed on said conductive substrate, of nanometer and/or micron size and of elongated shape in a direction perpendicular to said conductive substrate, and
a source generating an optical wave for direct optical control of the emitter or the plurality of emitters via an electrical field of said optical wave,
wherein each said emitter comprises a first material of the carbon type with substantially sp2 bonding, encapsulating, in direct or indirect contact, a second metallic material, said second metallic material at least located at a top of the emitter, and
wherein said second material has a plasma frequency approximately equal to or greater than a frequency of the optical control wave.

* * * * *